United States Patent
Georgeau et al.

(10) Patent No.: US 6,579,924 B2
(45) Date of Patent: Jun. 17, 2003

(54) PITCH POCKET AND SEALANT

(75) Inventors: Philip C. Georgeau, Kalamazoo, MI (US); Lisa A. Mulder, Kalamazoo, MI (US)

(73) Assignee: Chem Link Inc., Kalamazoo, MI (US)

( * ) Notice: Subject to any disclaimer, the term of this patent is extended or adjusted under 35 U.S.C. 154(b) by 0 days.

(21) Appl. No.: 09/735,265

(22) Filed: Dec. 12, 2000

(65) Prior Publication Data

US 2002/0115770 A1 Aug. 22, 2002

(51) Int. Cl.$^7$ .................................. C08K 5/06
(52) U.S. Cl. .................... 524/376; 524/377; 524/588
(58) Field of Search ................ 524/376, 377, 524/588

(56) References Cited

U.S. PATENT DOCUMENTS

| 6,077,896 A | 6/2000 | Yano et al. |
| 6,124,387 A | 9/2000 | Wang et al. |

OTHER PUBLICATIONS

"Silyl–Terminated Polyethers for Sealants and Adhesives of a New Generation"; *Kaneka MS Polymer™ Kaneka Silyl™*; Kaneka Corporation, Tokyo Office, Tokyo, Japan, pp. 1–14.

"Applications in Sealants"; *Silmond™ Silicon–Modified Polyethers*; Union Chemicals and Plastic Company, Inc., Specialty Chemicals Division, Danbury, CT, 6 pages.

*Primary Examiner*—Kriellion A. Sanders
(74) *Attorney, Agent, or Firm*—Price, Heneveld, Cooper, DeWitt & Litton

(57) ABSTRACT

A one-part pourable sealant that is thermosetting, non-shrinking, and capable of quickly curing in a closed cavity to a depth of at least two inches includes a silyl-terminated polymer, a hygroscopic plasticizer present in an amount that is effective to promote rapid and deep curing, and a catalyst for promoting curing of the silyl-terminated polymer. The sealer composition is useful in a method of forming a seal around a roof penetration. The method includes dispensing the sealer composition into a pitch pocket formed around a roof penetration and allowing the sealer composition dispensed into the pitch pocket to cure by exposure to moisture in the air.

20 Claims, No Drawings

PITCH POCKET AND SEALANT

FIELD OF THE INVENTION

This invention relates to a one-part moisture curable pourable sealer composition, and more particularly to a one-part moisture curable, pourable sealer composition that achieves fast, deep curing.

BACKGROUND OF THE INVENTION

A particular application for a one-part moisture curable, pourable sealer composition that achieves fast, deep curing is in the field of sealing mechanical penetrations in a waterproof membrane covering a roof substrate. In a typical low slope membrane roof, provision must be made for sealing penetrations of the roof by vent pipes, support straps, conduits, guy anchors and similar elements. Generally, a pitch pocket or pan which surrounds the penetrating element is used. Although the invention is useful with generally any type of pitch pocket, examples of preferred pitch pockets are described in commonly owned U.S. Pat. Nos. 5,493,827, and 5,768,838. A sealant is poured into the pitch pocket or pan around the penetrating element. Generally a two-part urethane pourable sealant composition is used. An advantage with two-part pourable urethane sealant compositions is that they set in approximately two hours to form a solid composite seal with the perimeter or inner surface of the walls or curbs of the pitch pocket. However, a disadvantage with the two-part pourable urethane sealant compositions is that they must be shipped to the site at which they are used in two separate parts that are mixed just prior to being poured into a pitch pocket. Thus, the use of a two-part pourable urethane sealer composition, as opposed to a one-part sealer composition, involves an additional undesirable step. Additionally, care must be taken during the mixing step to insure that the two components are thoroughly mixed, and mixed in the proper proportions, as improper mixing can adversely affect performance of the roof penetration seal. Thus, a one-part sealant composition that eliminates the need for mixing would be highly desirable.

One-part sealants have been used for sealing mechanical penetrations in a waterproof membrane covering a roof substrate. However, the one-part sealants that have been used heretofore have disadvantages. For example, molten asphalt or coal tar have been used as one-part sealants for sealing roof penetrations. These materials shrink upon curing, and exhibit poor weatherability. Also, because of their thermoplastic nature, they often melt and run into a building. This can lead to disastrous results in a fire situation. Solvent-based asphalt and rubber-modified asphalt have also been used as one-part sealants for sealing roof penetrations in a waterproof membrane covering a roof substrate. However, these products have generally all of the same disadvantageous associated with bituminous materials (e.g., molten asphalt or coal tar), and exhibit even greater shrinkage caused by evaporation of the solvent. One-part moisture curable urethanes have also been used. Although one-part moisture curable urethanes are thermosetting, known one-part urethane sealants are capable of only shallow cures, usually less than ⅜ inch deep. Deeper cures of at least 2 inches are desired. Inadequate depth of cure can result in splitting and cracking of the seal. Cure times for these one-part moisture curable urethanes have been extremely lengthy. Also, they contain small amounts of solvent that can cause volume shrinkage when poured into a pitchpan.

Accordingly, there remains a need for a one-part pourable sealant that is thermosetting, non-shrinking, and capable of quickly curing in a closed cavity to a depth of at least two inches.

SUMMARY OF THE INVENTION

The invention overcomes problems associated with known one-part thermosetting sealant compositions by achieving rapid, deep curing without significant shrinkage. The advantages of this invention are achieved by employing a one-part moisture curable, pourable sealer composition containing a silyl-terminated polymer.

In one aspect of the invention there is provided a one-part moisture curable, pourable sealer composition containing a silyl-terminated polymer and a hygroscopic plasticizer.

In accordance with another aspect of the invention, there is provided a method of forming a seal around a roof penetration, that includes a step of dispensing a one-part moisture curable, pourable sealer composition containing a silyl-terminated polymer into a pitchpan or pitch pocket formed around a roof penetration.

These and other features, advantages and objects of the present invention will be further understood and appreciated by those skilled in the art by reference to the following specification and claims.

DETAILED DESCRIPTION OF PREFERRED EMBODIMENTS

The one-part, moisture curable, pourable sealer compositions in accordance with a preferred embodiment of this invention comprise a silyl-terminated polymer, a hygroscopic plasticizer, and a catalyst for promoting curing of the silyl-terminated polymer. Other ingredients that may be included in the composition include one or more fillers, antioxidants, ultraviolet absorbers, adhesion promoters, dehydrating agents, and colorants.

Examples of silyl-terminated polymers that may be used include silylated polyurethane, silylated polyethers, and silylated polyesters. The silylated polymers or silyl-terminated polymers of this invention include two or more reactive silyl groups, with alpha, omega-telechelic silane-terminated polymers being preferred.

An example of a suitable silyl-terminated polymer that may be used is an oxyalkylene polymer having at least one reactive silyl group at each end of the polymer molecule. The backbone of the silyl-terminated oxyalkylene polymer has repeating units represented by the formula: —R—O— wherein R represents a divalent organic group, preferably a straight or branched alkylene group containing 1 to 14 carbon atoms, and more preferably straight or branched alkylene groups containing 2 to 4 carbon atoms. Especially preferred are polypropylene oxide backbones, polyethylene oxide backbones, and copolyethylene oxide/polypropylene oxide backbones. Other repeating units may include, but are not limited to —CH$_2$O—, —CH$_2$CH(CH$_3$)O—, —CH$_2$CH(C$_2$H$_5$)O—, —CH$_2$C(CH$_3$)$_2$O—, , —CH$_2$CH$_2$CH$_2$CH$_2$O— to and the like.

The reactive silyl group contained in the silyl-terminated polymers may be represented by the formula:

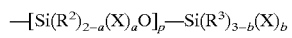

$$-[Si(R^2)_{2-a}(X)_a O]_p - Si(R^3)_{3-b}(X)_b$$

wherein $R^2$ and $R^3$ are the same or different and each represents an alkyl group containing 1 to 20 carbon atoms, an aryl groups containing 6 to 20 carbon atoms, an aralkyl group containing 7 to 20 carbon atoms or a triorganosiloxy group of the formula $(R^4)_3SiO—$ (wherein $R^4$ independently represents a hydrocarbon group containing 1 to 20 carbon atoms) and, when two or more $R^2$ and/or $R^3$ groups are present, they may be the same or different; X represents a hydrolyzable group or a hydroxyl group and, when two or more X groups are present, they may be the same or different; a represents an integer of 0 to 2; b represents an integer of 0 to 3; and p represents an integer of 0 to 19 and, when p is 2 or more, the $—[Si(R_2)_{2-a}(X)_aO]$groups may be the same or different. In the reactive silyl group represented by the above general formula, there is at least one hydrolyzable group or hydroxyl group represented by X.

The above-mentioned alkyl group containing 1 to 20 carbon atoms includes, but is not limited to methyl, ethyl, isopropyl, butyl, t-butyl, cyclohexyl and the like.

The above-mentioned aryl group containing 6 to 20 carbon atoms includes, but is not limited to, phenyl, naphthyl and the like.

The above-mentioned aralkyl group containing 7 to 20 carbon atoms includes, but is not limited to, benzyl and the like.

The above-mentioned monovalent hydrocarbon group containing 1 to 20 carbon atoms includes, but is not limited to, methyl, ethyl, isopropyl, butyl, t-butyl, pentyl, ethynyl, 1-propenyl, vinyl, allyl, 1-methylbutyl, 2-ethylbutyl, phenyl and the like.

The above-mentioned hydrolyzable group represented by X is not limited to any particular species and includes a hydrogen atom, halogen atoms, and alkoxyl, acyloxy, ketoximate, amino, amido, acid amido, aminoxy, mercapto, alkenyloxy and the like groups. Among these, a hydrogen atom and alkoxyl, acyloxy, ketoximate, amino, amido, aminoxy, mercapto and alkenyloxy groups are preferred and, from the viewpoint of mild hydrolyzability and ease of handling, alkoxyl groups are particularly preferred.

One to three hydroxyl groups and/or hydrolyzable groups each represented by X may be bound to one silicon atom. The sum total of the hydroxyl and/or hydrolyzable groups in the reactive silyl group represented by the above general formula is preferably within the range of 1 to 5.

The number of silicon atoms forming the above-mentioned reactive silyl group may be 1 or 2 or more.

In the practice of the present invention, those reactive silyl groups which are represented by the general formula shown below are preferred because of their ready availability:

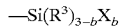
$—Si(R^3)_{3-b}X_b$ wherein $R^3$, X and b are as defined above.

Methods of introducing a reactive silyl group onto a polymer, such as a polyether, or more specifically a polyoxyalkylene polymer, are well known in the art. For example, polymers having terminal hydroxyl, epoxy or isocyanate functional groups can be reacted with a compound having a reactive silyl group and a functional group capable of reacting with the hydroxyl, epoxy or isocyanate group.

As another example, silyl-terminated polyurethane polymers may be used. A suitable silyl-terminated polyurethane polymer may be prepared by reacting a hydroxyl-terminated polyether, such as a hydroxyl-terminated polyoxyalkylene, with a polyisocyanate compound, such as 4,4'-methylenebis-(phenylisocyanate), to form an isocyanate-terminated polymer, which can then be reacted with an aminosilane, such as aminopropyltrimethoxysilane, to form a silyl-terminated polyurethane.

Silyl-terminated polyesters are those having the reactive silyl groups discussed above with a backbone comprising —O—CO—$R^5$—CO—O—$R^6$— or —$R^7$—CO—O— repeat units, wherein $R^5$, $R^6$ and $R^7$ are divalent organic groups such as straight or branched alkylene groups.

The silyl-terminated polymers used in this invention may be straight-chained or branched, and typically have a weight average molecular weight of from about 500 to 50,000 Daltons, and more preferably from about 1,000 to about 30,000 Daltons.

Suitable silyl-terminated polyethers are commercially available from Kaneka Corporation under the names KANEKA MS POLYMER™ and KANEKA SILYL™, and from Union Carbide Specialty Chemicals Division under the name SILMOD™.

The one-part moisture curable, pourable sealer compositions of this invention preferably contain a silanol condensation cayalyst for promoting fast reaction among the reactive silyl groups contained in the silyl-terminated polymers. Examples of silanol condensation catalysts include, but are not limited to, titanate esters such as tetrabutyl titanate and tetrapropyl titanate; organotin compounds such as dibutyltin dilaurate, dibuytltin maleate, dibutyltin diacetate, stannous octylate, stannous napthenate, reaction products from dibutyltin oxide and phthalate esters, and dibutyltin diacetylacetonate; organoaluminum compounds such as aluminum trisacetylacetonate, aluminum tris(ethylacetoacetate) and diisopropocyaluminum ethyl acetoacetate; reaction products from bismuth salts and organic carboxylic acids, such as bismuth tris(2-ethylhexonate) and bismuth tris (neodecanoate); chelate compounds such as zirconium tetraacetylacetonate and titanium tetraacetylactonate; organolead compounds such as lead octylate; organovanadium compounds; amine compounds such as butylamine, octylamine, dibutylamine, monoethanolamnie, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole with carboxylic or other acids; low-molecular-weight polyamide resins derived from excess polyamines and polybasics acids; and reaction products from excess polyamines and epoxy compounds. These may be used individually or in combination.

Among the silanol condensation catalysts mentioned above, organometallic compounds are preferred. The silanol condensation catalyst may be used in an amount of from about 0.01 to about 20 parts by weight per 100 parts by weight of the silyl-terminated polymer, with a more preferred addition level being from about 0.1 to about 10 parts by weight per 100 parts by weight of the silyl-terminated polymer.

In the curable compositions of the present invention, there may further be added, when necessary, various additives such as dehydrating agents, compatibilizers, tackifiers, physical property modifiers, storage stability improving agents, fillers, antioxidants, adhesion promoters, ultraviolet absorbers, metal deactivators, antiozonants, light stabilizers, amine type radical chain inhibitors, phosphorus-containing peroxide decomposers, lubricants, pigments, foaming agents, flame retardants and antistatic agents, each in an adequate amount.

The fillers mentioned above include, but are not limited to, wood meal, walnut shell flour, rice hull flour, pulp, cotton chips, mica, graphite, diatomaceous earth, china clay, kaoline, clay, talc, fumed silica, precipitated silica, silicic anhydride, quartz powder, glass beads, calcium carbonate, magnesium carbonate, titanium oxide, carbon black, glass balloons, aluminum powder, zinc powder, asbestos, glass fiber and carbon fiber. The above fillers may be used individually or in combination.

The hygroscopic plasticizer can be selected from compounds that serve a plasticizing function and which, when added to the one-part moisture curable, pourable sealer composition, allow moisture to be imbibed into the material. Most plasticizers are hydrophobic and do not exhibit the desired hygroscopic properties. Examples of suitable hygroscopic plasticizers that may be used in the one-part moisture curable, pourable sealer compositions of this invention include polyether polyols such as hydroxyl-terminated polypropylene oxide plasticizers. A suitable commercially availabe polypropylene oxide hygroscopic plasticizer is UNCON® LB 285 (UCON® LB 285 is polyoxyalkylene glycol mad from n-butanol and propylene oxide), available from Union Carbide. The hygroscopic plasticizer is present in an amount that is effective to promote rapid and deep curing of the one-part moisture curable pourable sealer compositions of this invention upon exposure to ambient moisture. A suitable amount is from about 5 to about 50 parts by weight, and more preferably from about 10 to about 30 parts by weight, per 100 parts by weight of the silyl-terminated polymer.

The moisture curable compositions of this invention are particularly useful as sealants, especially as a sealer composition for forming a seal around a roof penetration. When used as a sealer for sealing a roof penetration, the composition is dispensed into to pitchpan formed around a roof member. A pitchpan is any type of continuous wall or curb formed around a roof penetration through a waterproof membrane covering a roof substrate, and into which a sealer composition is dispensed to provide a water-impermeable barrier. While not being bound to any particular theory, it is believed that the hygroscopic plasticizer allows moisture to be imbibed into the sealer composition, whereby rapid, deep curing of the composition occurs.

EXAMPLES

The following examples illustrate the invention in further detail, but do not limit the scope of the invention.

An example of a one-part moisture curable, pourable sealer composition in accordance with this invention was prepared by mixing the following ingredients:

| Base Polymer | MS-303 | 229.4 |
| Plasticizer | Diisodecyl phthalate | 121.0 |
| Hygroscopic Plasticizer | UCON® LB 285 | 60.5 |
| Filler/Reinforcer | CaCO₃ Huber G-325 | 501 |
| Reinforcer/Filler-Pigment | Carbon Black RU-0262 | 56.8 |
| Antioxidant | Irganox 245 | 5.8 |
| UV Absorber | Tinuvin 328 | 2.9 |
| Thioxotrope | Disparlon 6500 | 3.4 |
| Dehydrating Agent | WITCO A-171 (vinyl silane) | 6.4 |
| Water Scavenger | WITCO A-171 (vinyl silane) | 6.4 |
| Adhesion Promoter | WITCO A-1120 (aminosilane coupling agent) | 6.4 |
| Catalyst (Organo Tin) | Fomrez SU11A | 5.6 |

Another example of a one-part moisture curable, pourable composition in accordance with this invention was prepared by mixing the following ingredients:

| Base Polymer | Desmoseal LS 2237 (SPUR) | 229.4 |
| Plasticizer | Diisodecyl phthalate | 121.0 |

-continued

| Hygroscopic Plasticizer | UCON® LB 285 | 60.5 |
| Filler/Reinforcer | CaCO₃ Huber G 325 | 501 |
| Filler/Pigment | Carbon Black RV-0262 | 56.8 |
| Antioxidant | Irganox 245 | 5.8 |
| UV Absorber | Tinuvin 328 | 2.9 |
| Thixotrope | Disparlon 6500 | 3.4 |
| Dehydrating Agent | WITCO A-171 (vinyl silane) | 6.4 |
| Water Scavenger | WITCO A-171 (vinyl silane) | 6.4 |
| Adhesion Promoter | WITCO A1120 | 6.4 |
| Catalyst (Organo Tin) | Foamrez SU11A | 5.6 |

The above formulations exhibited fast, deep curing without shrinkage.

Side-by-side comparisons under identical conditions were preformed on the following compositions: (1) a commercially available moisture curable asphalt modified urethane, self-leveling pourable sealer (comparative Example 1); (2) a moisture curable asphalt modified urethane, self-leveling waterproofing compound (comparative Example 2); (3) a moisture curable self-leveling urethane sealer (comparative Example 3); (4) a commercially available silane-terminated polyether moisture curable, pourable sealer with 6 percent (by weight of he composition) hygroscopic plasticizer (LB-285) (Example 1 in accordance with the invention); and (5) a silane-terminated polyether moisture curable pourable sealer composition with 18 percent (by weight of the composition) diisodecyl phthalate plasticizer (Example 2 in accordance with the invention).

The cure condition and Shore A Durometer after 7 days, 30 days, 60 days and 120 days are listed below in Tables 1 and 2. In each case, the depth of cure was determined in a 5-inch diameter pitch pocket applied over a modified bitumen membrane.

TABLE 1

Depth of Cure

| | 7 Days | 30 Days | 60 Days | 120 Days |
|---|---|---|---|---|
| Comparative Example 1 | ⅜" skin | ½" skin | 1" uncured core | 1" uncured core |
| Comparative Example 2 | ⅜" skin | ⅜" skin | ½" skin | 1.4" uncured core |
| Comparative Example 3 | ⅜" skin | ⅜" skin | ⅜" skin | ⅜" skin |
| Example 1 | ¼" skin | Cure Through | Cure Through | Cure Through |
| Example 2 | ⅜" skin | ¾" skin | Cure Through | Cure Through |

TABLE 2

Shore A Durometer

| | 7 Days | 30 Days | 60 Days | 120 Days |
|---|---|---|---|---|
| Comparative Example 1 | <10 | <10 | 20 | 20 |
| Comparative Example 2 | <5 | <10 | 25 | 30 |
| Comparative Example 3 | 10 | 20 | 20 | 20 |
| Example 1 | 20 | 30 | 35 | 35 |
| Example 2 | <10 | 20 | 25 | 30 |

From the above data, it can be seem that the sealer compositions in accordance with the invention generally cure more rapidly and to a deeper depth. Further, the compositions of this invention form cured materials exhibiting a higher Shore A Durometer.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A one-part, moisture curable, pourable sealer composition, comprising:
   a silyl-terminated polymer, a hygroscopic plasticizer present in an amount that is effective to promote rapid and deep curing, and a catalyst for promoting curing of the silyl-terminated polymer.

2. The composition of claim 1, wherein the silyl-terminated polymer is selected from the group consisting of silylated polyurethanes, silylated polyethers, and silylated polyesters.

3. The composition of claim 2, wherein the silylated polymer is an alpha, omega-telechelic silyl-terminated polymer.

4. The composition of claim 1, wherein the silyl-terminated polymer is an oxyalkylene polymer having at least one reactive silyl group at each end of the polymer molecule.

5. The composition of claim 4, wherein the silyl-terminated polymer has a backbone selected from the group consisting of polypropylene oxide, polyethylene oxide, and copolyethylene oxide/polypropylene oxide.

6. A one-part, moisture curable, pourable sealer composition, comprising:
   a silyl-terminated polymer, a hygroscopic plasticizer present in an amount that is effective to promote rapid and deep curing, and a catalyst for promoting curing of the silyl-terminated polymer, wherein the silyl-terminated polymer is a silyl-terminated polyurethane.

7. The composition of claim 6, wherein the silyl-terminated polyurethane is the reaction product of an isocyanate-terminated polymer with an aminosilane, and wherein the isocyanate-terminated polymer is the reaction product of a hydroxyl-terminated polyether with a polyisocyanate compound.

8. The composition of claim 7, wherein the hydroxyl-terminated polyether is a hydroxyl-terminated polyoxyalkylene.

9. The composition of claim 1, wherein the silyl-terminated polymer has a weight average molecular weight of from about 500 to 50,000 Daltons.

10. The composition of claim 1, wherein the hygroscopic plasticizer is a polyether polyol.

11. The composition of claim 10, wherein the polyether polyol is a hydroxyl-terminated polypropylene oxide.

12. The composition of claim 10, wherein the hygroscopic plasticizer is present in the one-part moisture curable pourable sealer composition in an amount of from about 5 to about 50 parts by weight per 100 parts by weight of the silyl-terminated polymer.

13. A method of forming a seal around a roof penetration, comprising:
   dispensing a one-part moisture curable, pourable sealer composition into a pitch pocket formed around the roof penetration, said one-part moisture curable pourable sealer composition containing a silyl-terminated polymer and a hygroscopic plasticizer present in an amount that is effective to promote rapid and deep curing.

14. The method of claim 13, wherein the silyl-terminated polymer is selected from the group consisting of silylated polyurethanes, silylated polyethers, and silylated polyesters.

15. The method of claim 14, wherein the silylated polymer is an alpha, omega-telechelic silyl-terminated polymer.

16. The method of claim 13, wherein the silyl-terminated polymer is an oxyalkylene polymer having at least one reactive silyl group at each end of the polymer molecule.

17. The method of claim 16, wherein the silyl-terminated polymer has a backbone selected from the group consisting of polypropylene oxide, polyethylene oxide, and copolyethylene oxide/polypropylene oxide.

18. A method of forming a seal around a roof penetration, comprising:
   dispensing a one-part moisture curable, sealer composition into a pitch pocket formed around the roof penetration, said one-part moisture curable pourable sealer composition containing a silyl-terminated polymer and a hygroscopic plasticizer present in an amount that is effective to promote raped and deep curing, wherein the silyl-terminated polymer is a silyl-terminated polyurethane.

19. The method of claim 13, wherein the hygroscopic plasticizer is a polyether polyol.

20. The method of claim 19, wherein the polyether polyol is a hydroxyl-terminated polypropylene oxide.

* * * * *

UNITED STATES PATENT AND TRADEMARK OFFICE
CERTIFICATE OF CORRECTION

PATENT NO. : 6,579,924 B2
DATED : June 17, 2003
INVENTOR(S) : Phillip C. Georgeau et al.

It is certified that error appears in the above-identified patent and that said Letters Patent is hereby corrected as shown below:

Column 1,
Line 55, "disadvantageous" should be -- disadvantage --.

Column 2,
Line 59, delete "to" before "and".
Line 66, "aryl groups" should be -- aryl group --.

Column 4,
Line 33, after "monoethanolamine," insert -- diethanolamine, triethanolamine, diethylenetriamine, triethylenetetramine, --.
Line 38, after "methylimidazole" insert -- and 1,8-diazabicyclo (5.4.0)undecene-7 (DBU); salts of said amine compounds --.

Column 5,
Line 15, "mad" should be -- made --.
Line 28, "to pitchpan" should be -- a pitchpan --.

Column 6,
Line 25, "he" should be -- the --.

Column 8,
Line 35, after "curable," insert -- pourable --.
Line 40, "raped" should be -- rapid --.

Signed and Sealed this

Ninth Day of December, 2003

JAMES E. ROGAN
*Director of the United States Patent and Trademark Office*